(12) United States Patent
Ward et al.

(10) Patent No.: US 8,880,889 B1
(45) Date of Patent: Nov. 4, 2014

(54) SYSTEMS AND METHODS FOR REMOTE AUTHORIZATION OF FINANCIAL TRANSACTIONS USING PUBLIC KEY INFRASTRUCTURE (PKI)

(75) Inventors: Hilary Ward, Princeton Junction, NJ (US); Gary E. Greenwald, Briarcliff Manor, NY (US); Francis A. Shanahan, Watchung, NJ (US)

(73) Assignee: Citigroup Global Markets, Inc., New York, NY (US)

( * ) Notice: Subject to any disclaimer, the term of this patent is extended or adjusted under 35 U.S.C. 154(b) by 952 days.

(21) Appl. No.: 12/041,425

(22) Filed: Mar. 3, 2008

Related U.S. Application Data

(60) Provisional application No. 60/904,677, filed on Mar. 2, 2007.

(51) Int. Cl.
*G06F 21/00* (2013.01)

(52) U.S. Cl.
USPC .......................................... 713/176; 705/67

(58) Field of Classification Search
USPC .......................................... 713/176; 705/67
See application file for complete search history.

(56) References Cited

U.S. PATENT DOCUMENTS

| | | |
|---|---|---|
| 6,978,364 B1 | 12/2005 | Balaz et al. |
| 7,083,090 B2 * | 8/2006 | Zuili ............................ 235/383 |
| 7,392,533 B2 | 6/2008 | Ternasky et al. |
| 7,448,080 B2 | 11/2008 | Karjala et al. |
| 7,454,376 B1 | 11/2008 | Argenbright |
| 7,500,097 B2 | 3/2009 | Kostal et al. |
| 7,509,489 B2 | 3/2009 | Kostal et al. |
| 7,580,857 B2 * | 8/2009 | VanFleet et al. ........... 705/14.41 |
| 7,610,484 B2 | 10/2009 | Kapoor |
| 7,739,195 B2 | 6/2010 | Polk et al. |
| 7,761,374 B2 * | 7/2010 | Sahota et al. ................... 705/39 |
| 2002/0062342 A1 | 5/2002 | Sidles |
| 2003/0191703 A1 | 10/2003 | Chen et al. |
| 2003/0217264 A1 * | 11/2003 | Martin et al. ................. 713/156 |
| 2004/0044621 A1 | 3/2004 | Huang et al. |
| 2004/0107170 A1 * | 6/2004 | Labrou et al. .................. 705/64 |
| 2004/0122685 A1 * | 6/2004 | Bunce ............................... 705/1 |
| 2004/0128392 A1 | 7/2004 | Blakley et al. |
| 2005/0102240 A1 * | 5/2005 | Misra et al. ..................... 705/59 |
| 2005/0120125 A1 | 6/2005 | Morten et al. |
| 2006/0077437 A1 * | 4/2006 | Lovat et al. .................. 358/1.15 |
| 2006/0143107 A1 | 6/2006 | Dumas et al. |
| 2006/0195816 A1 | 8/2006 | Grandcolas et al. |

(Continued)

FOREIGN PATENT DOCUMENTS

WO      WO 02/31718       *   4/2002

OTHER PUBLICATIONS

U.S. Appl. No. 11/981,177, filed Oct. 30, 2007.
U.S. Appl. No. 12/049,086, filed Mar. 14, 2008.

(Continued)

*Primary Examiner* — Kambiz Zand
*Assistant Examiner* — Ali Shayanfar
(74) *Attorney, Agent, or Firm* — Ropes & Gray LLP

(57) ABSTRACT

The invention relates to systems and methods for secure, remote, wireless submission of financial transactions. Authentication and authorization functionality are provided through use of proof of possession tests, a token service that provides a user device with a token that includes user entitlement data, and high assurance digital certificates.

35 Claims, 8 Drawing Sheets

(56) References Cited

U.S. PATENT DOCUMENTS

2006/0282528 A1* 12/2006 Madams et al. .............. 709/224
2007/0022469 A1   1/2007 Cooper et al.
2007/0112578 A1   5/2007 Randle et al.
2007/0136197 A1*  6/2007 Morris ........................... 705/44
2007/0179885 A1*  8/2007 Bird et al. ...................... 705/39
2007/0215683 A1   9/2007 Koorland et al.
2007/0288750 A1* 12/2007 Camenisch et al. .......... 713/168

OTHER PUBLICATIONS

Bank of America PayMode. (2004) Retrieved from http://corp.bankofamerica.com/public/portal?_pd_page_label=paymode/services/security on Dec. 29, 2008.
Non-Final OA issued Jan. 6, 2011 in U.S. Appl. No. 11/981,177.
Non-Final OA issued Apr. 19, 2011 in U.S. Appl. No. 12/049,086.
Final OA issued Jan. 6, 2012 in U.S. Appl. No. 12/049,086.
Non-Final OA issued Jul. 25, 2012 in U.S. Appl. No. 12/049,086.

* cited by examiner

SYSTEMS AND METHODS FOR REMOTE AUTHORIZATION OF FINANCIAL TRANSACTIONS USING PUBLIC KEY INFRASTRUCTURE (PKI)

CROSS REFERENCE TO RELATED APPLICATIONS

The instant application claims priority from provisional application No. 60/904,677, filed Mar. 2, 2007, the disclosure of which is incorporated herein by reference in its entirety.

FIELD OF THE INVENTION

This invention relates to systems and methods for remote authorization of transactions using Public Key Infrastructure (PKI) based on high assurance digital identification.

BACKGROUND OF THE INVENTION

Businesses and governments utilize identity management systems to manage user and device/application identities across multiple systems and applications in order to ensure that unauthorized parties do not access sensitive user communications. Certain identity management solutions rely on a technology known as Public Key Infrastructure (PKI), which enables users to be authenticated to each other by confirming identities issued through a trusted third party entity. Each PKI user is issued both a private key (analogous to code or other identifier that is known only to the user), and a public key, which is disclosed to all users. Central to a PKI system is that the public key be issued by a trusted third party. For example, if user A wishes to send a sensitive message to user B, user A would use user B's public key chained to the trusted third party to encrypt the message, which user B would decrypt with his private key.

Trust is the characteristic that one entity is willing to rely upon a second entity to execute a set of actions and/or to make a set of assertions about a subject. If public keys were not chained to a trusted third party, however, a malicious party could publish a public key purporting to be user B, and thereby intercept messages to user B using the phony public key's private equivalent.

To avoid this problem, institutions known as Certificate Authorities (CA) often serve the role of independent, trusted third parties to issue and manage identity certificates. In addition to encrypting messages (which ensures privacy), user A can authenticate himself to user B by using user A's private key to digitally sign the message and append to the message a digital certificate, signed by a trusted CA, indicating user A's public key. When user B receives the message, she can use user A's public key to decrypt the message, verify the digital signature of user A, and validate user A's public key by confirming with the trusted CA that the digital certificate is valid. Examples of CAs include Identrust, Entrust and VeriSign.

Wireless communication systems have grown dramatically in recent years. For example, numerous businesses, governments and institutions rely heavily on BLACKBERRY mobile devices to communicate. What is needed are more effective security systems to protect the integrity and authenticity of wireless communications and transactions.

SUMMARY OF THE INVENTION

This invention relates to methods and apparatus for signing and authenticating transactions initiated by mobile devices utilizing the PKI system described above. According to one aspect, the invention relates to a method of managing remote communications using a Public Key Infrastructure (PKI) system. The method includes receiving at a centralized system a message containing at least one transaction request transmitted by a user using a remote wireless device. In one embodiment, the message is received according to the SOAP protocol.

The transaction request is digitally signed by the user using the user's private key. The message also includes a token from a security token service which contains data or information relating to the user's entitlements. The centralized system includes information relating to the entitlements required for at least the requested transaction.

The method further includes communicating with a trusted third party to authenticate the message using the user's public key and verifying the entitlement information contained in the token to confirm whether the user is authorized to perform the requested transaction. In one embodiment, the token is also authenticated. In one embodiment, the centralized system stores data related to a first set of users entitled to carry out a first set of transactions and data related to a second set of users entitled to carry out a second set of transactions. The first set of transactions is at least partially different than the second set of transactions.

The requested transaction is then performed if the user's entitlements satisfies all required entitlements for the requested transaction. In various embodiments, the transactions may include banking transactions, such as payments transactions, funds transfer transactions, securities transactions, and currency exchange transactions.

According to another aspect, the invention relates to a method of submitting a transaction by a mobile device. The method includes receiving by the mobile device, data authenticating the identity of a user of the mobile device. The mobile device then generates a transaction message including a token that verifies the authenticated identity of the user and entitlements associated with that user. In one embodiment, the token is digitally signed and includes or is accompanied by a digital certificate. The transaction message is then digitally signed using a private key and transmitted to a server for execution. In one embodiment, a digital certificate from a certificate authority verifying the user's public key is appended to the transfer message prior to transmission.

In one embodiment receiving the data authenticating the identity of the user includes receiving data from an RFID device in the possession of the user. In another embodiment, receiving the data authenticating the identity of the user includes receiving data from a smart card inserted into one of the mobile device and a smart card reader coupled to the device. In one such embodiment, the method includes retrieving either the token or a digital certificate from the smart card. In another embodiment, receiving the data authenticating the identity of the user includes receiving biometric data.

In other embodiments, the method includes obtaining the token. For example, in one embodiment, the token is obtained by transmitting the data authenticating the identity of the user to a token service. In an alternative embodiment, the method includes obtaining the token by transmitting a digital certificate to the token service based on the data authenticating the identity of the user. The digital certificate may be securely stored on the mobile device, such that it can only be accessed upon successful user authentication. The data may be communicated and the token obtained via SOAP protocol communications. In another embodiment, the token itself is stored securely on the mobile device, such that it can only be accessed upon successful user authentication.

According to a third aspect, the invention relates to a method for managing communications among financial services systems, users of financial services systems, and trusted third parties in Public Key Infrastructure (PKI). The method includes receiving at a centralized system a user remotely generated message containing at least one financial transaction. The message is digitally signed by the user using the user's private key and is accompanied by a token from a security token service. The token contains data relating to the user's entitlements. The centralized system contains information relating to the entitlements required for at least the requested transaction and applications and databases for recording and updating financial information and transactions based on the transaction.

The method also includes communicating with a trusted third party to authenticate the user's public key. The entitlement information contained in the token is verified to confirm whether the user is authorized to perform the requested transaction. If the user has the proper authorization, the requested transaction is either carried out by the centralized system and the applications and databases of the centralized system are updated to reflect the transaction, or instructions are transmitted to another system or database to perform the financial transaction.

According to a fourth aspect, the invention relates to a mobile device for submission of transaction instructions. The mobile device includes a wireless transceiver, an authentication device, and a processor. In one embodiment, the authentication device includes an RFID reader. In another embodiment, the authentication device includes a biometric data input. In another embodiment, the authentication device includes a smart card reader. The smart card reader may be coupled to the device via a wired or wireless link.

The processor is configured to retrieve, based on the data accepted by the authentication device, a secure token including the identity of the user and entitlements associated with the user, generate a transaction message including the transaction to be submitted and the retrieved token, sign the transaction message utilizing a digital certificate, and transmit the signed transaction message to a server via the wireless transceiver for execution. In one embodiment, the processor retrieves the token via a smart card reader authentication device. In another embodiment, the mobile device includes a memory for storing the token, and the processor is configured to retrieve the token from the memory in response to the data accepted by the authentication device. In another embodiment, the processor retrieves the token by transmitting a token request via the wireless transceiver based on the data accepted by the authentication device. The request may be transmitted, for example, via the SOAP protocol. In one embodiment, the processor is also configured to access the digital certificate in response to the data accepted by the authentication device.

According to a fifth aspect, the invention relates to a transaction system that includes a mobile device, a token service, a certificate authority, and a financial institution system. The mobile device submits transaction messages, which are digitally signed by a user of the mobile device, to a financial institution. The transaction messages include transaction instructions and a token indicating entitlements of the user of the mobile device. The token service verifies the identity and entitlements of the user of the mobile device based on authentication data provided by the mobile device. The token service also provides the token to the mobile device in response to the authentication data. The certificate authority verifies the digital signature used to sign the transaction message. The financial institution system receives the transaction message, obtains verification of the authenticity of the transaction message by communicating with the certificate authority, and determines that the user of the mobile device is entitled to execute the transaction instructions based on the entitlements included in the token.

BRIEF DESCRIPTION OF THE FIGURES

The invention may be better understood from the following illustrative description with reference to the following drawings.

DESCRIPTION OF CERTAIN ILLUSTRATIVE EMBODIMENTS

Figure 1:
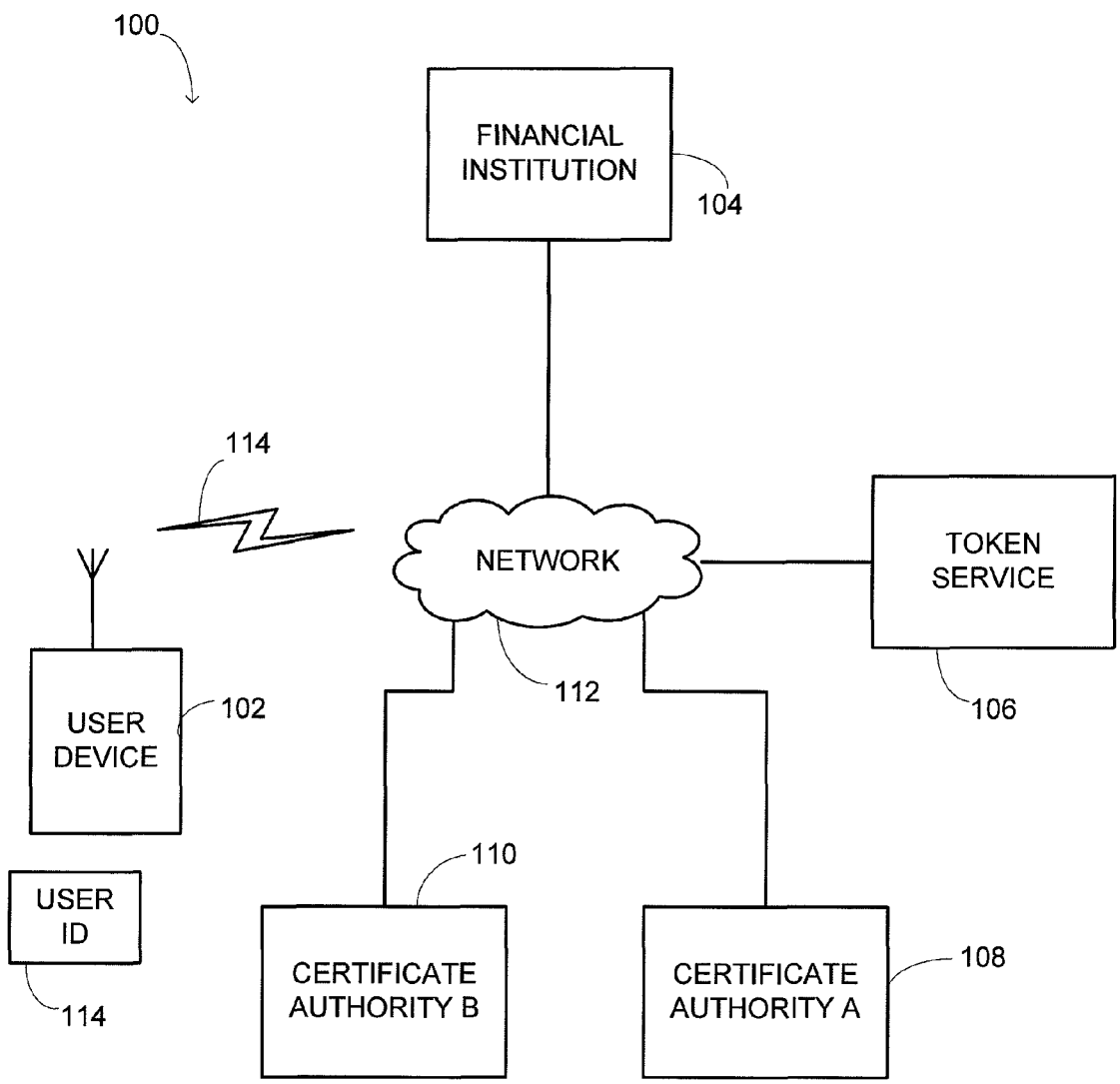
FIG. 1 is a block diagram of a system for submission of financial transactions from a mobile device, according to an illustrative embodiment of the invention.

To provide an overall understanding of the invention, certain illustrative embodiments will now be described. However, it will be understood by one of ordinary skill in the art that the methods described herein may be adapted and modified as is appropriate for the application being addressed and that the systems and methods described herein may be employed in other suitable applications, and that such other additions and modifications will not depart from the scope hereof FIG. 1 is a block diagram of a system 100 for submission of financial transactions from a user device 102 to a financial institution 104, according to an illustrative embodiment of the invention. In addition to the user device 102 and the financial institution 104, the system includes a token service 106, at least one certificate authority, e.g., certificate authority A 108 and certificate authority B 108, and a network 112 enabling communication between various components of the system 100. In various embodiments of the system 100, the network 112 is a publicly accessible network, such as the Internet, a private network operated by financial institutions, or a combination thereof. In some embodiments, the system 100 includes a separate electronic user identifier 114, such as a smart card or a RFID transponder.

Figure 3:
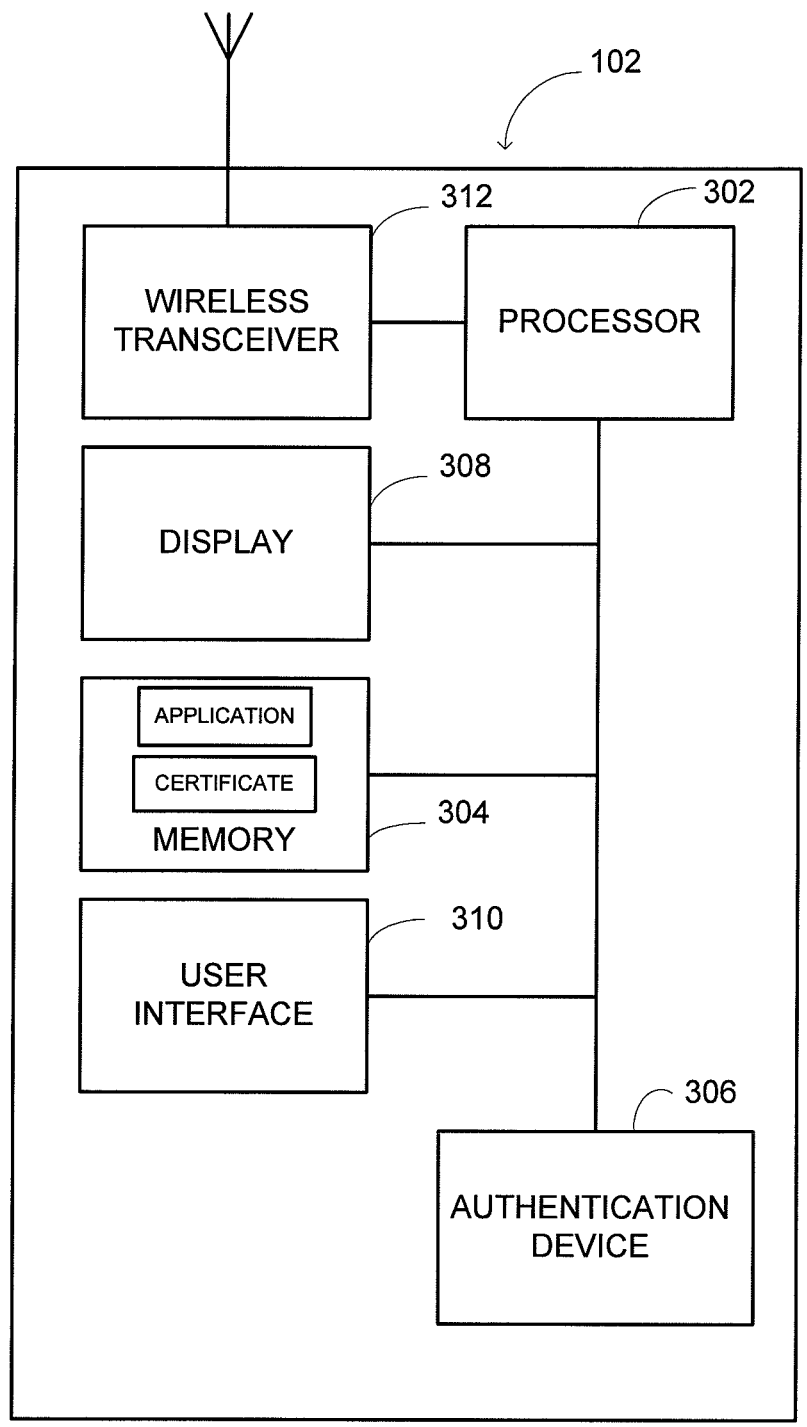
FIG. 3 is a block diagram of a mobile device suitable for use in the system of FIG. 1, according to an illustrative embodiment of the invention.

The user device 102, described further in relation to FIG. 3, is a mobile computing device capable of networked communication, preferably over a wireless link 114. For example, the mobile device may communicate over a Wi-Fi, Wi-Max, cellular, BLUETOOTH, satellite or other wireless communication link. The wireless link 114 couples to the user device 102 to the network 112. Suitable user devices include, without limitation, cellular telephones, smart phones, personal digital assistants, lap top computers, palm top computers, and other hand held computing devices, including BLACKBERRY communication devices offered by Research in Motion Limited, headquartered in Waterloo, Ontario, Canada.

The financial institution 104 can be, for example a bank, a brokerage, an exchange, or other financial institution desiring to enable high security financial transactions. One financial institution computing architecture suitable for use in the system is described further in FIG. 4.

The token service 106 is an online service that stores personal information about users and performs authentication functions. A user, via the user device 102, submits credentials to the token service 106 and receives a token in return. A token in one embodiment is an XML document that includes information or data indicating that the user has certain entitlements. Such information or data is referred to herein as "entitlement data." The term "entitlements" as used herein refers to the authority to carry out one or more specified actions or groups of actions. The entitlement data, in one embodiment, includes a set of authorized actions. In another embodiment, the entitlement data includes classes of authorized actions. In still other embodiments, the entitlement data includes an authority level or a role identifier (e.g., manager, director, salesperson, etc.). The entitlement data may also include thresholds with respect to particular actions or classes of actions. Preferably, communications between the user device 102 and the token service 106 occur according to the SOAP protocol.

The credentials supplied to the token service 106 can take several forms without departing from the scope of the invention. For example, in one implementation, the credentials include a high assurance digital certificate. In alternate implementations, the credentials include biometric information, a secret key, or other security information authenticating the user of the user device 102. Preferably, the credentials satisfy a proof of possession test. That is, the credentials verify that a specific known user is using the user device 102. This is in contrast to merely authenticating that the user device 102 is the device it claims to be. To satisfy a proof of possession test, it is preferable that the credentials, if stored on the user device 102, are only stored in a secure fashion that cannot be accessed without a user authenticating himself or herself to the user device 102, using, for example and without limitation, biometric information, a password, a RFID transponder, a BLUETOOTH dongle, or a smartcard. Alternatively, the credentials themselves can be stored on the smartcard or other removable memory device.

After generating the token based on the credentials, the token service 106 preferably digitally signs the token and appends a digital certificate including the public key of the token service 106. The digital certificate may be issued, for example, by certificate authority A 108 or certificate authority B 110. The token service 106 returns the digitally signed token to the user device 102. The token is then included by the user device 102 in communications with the financial institution 104 to securely communicate the entitlements of the user of user device 102.

Figure 2:
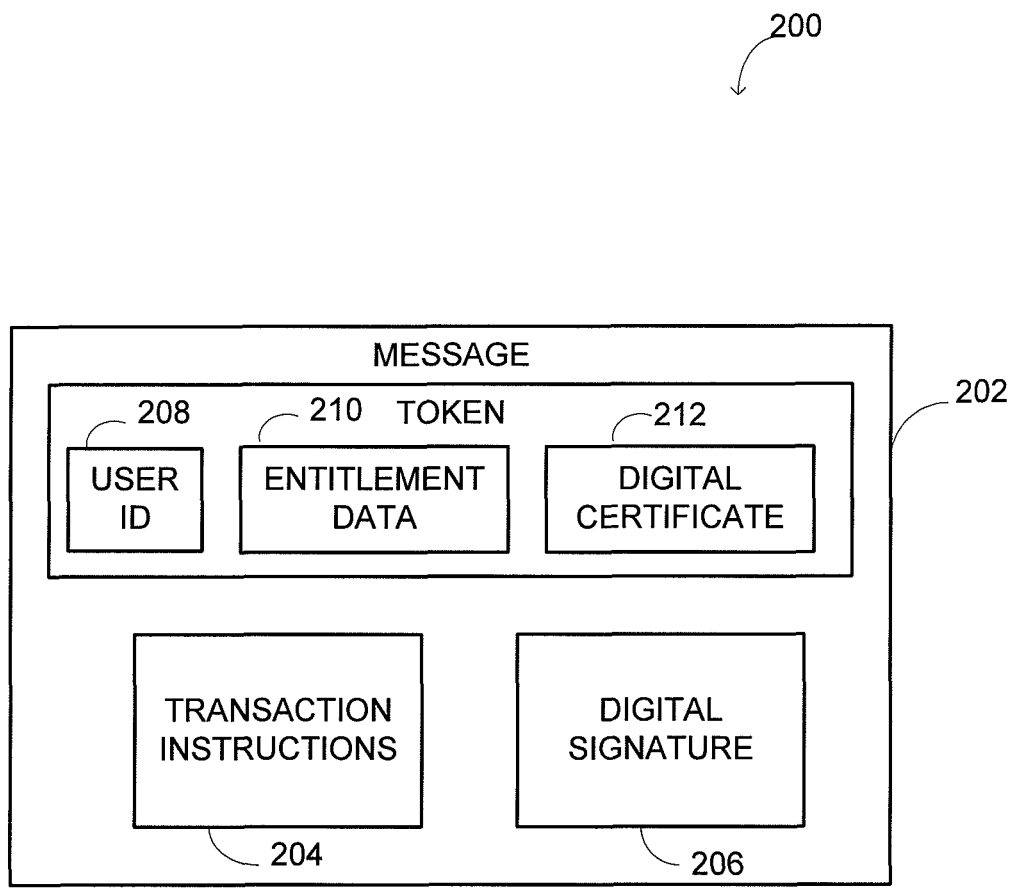
FIG. 2 is a diagram of a transaction message used in the system of FIG. 1 to communicate transaction instructions, according to an illustrative embodiment of the invention.

FIG. 2 is a diagram of a suitable transaction message 200 format for use in the system 100. The message 200 includes a token 202, transaction instructions 204, and a digital signature 206. In one embodiment, the message 200 is a SOAP protocol message, though alternative message formats can be employed without departing from the scope of the invention.

The token 202 is provided by a token service, such as token service 106. The token 202 includes a user ID 208, entitlement data 210, and a digital certificate 212. The user ID 208 identifies the sender of the transaction instructions. The user ID 208 may be a user's name, an employee ID, an account number, a user name, or other identifier that uniquely identifies the user to a recipient financial institution. Entitlement data 210, as described above, directly (for example, in list format), or indirectly (for example, by indicating a user role or position), indicates the types of transactions a user is permitted to execute and any limits that might be imposed on such permission. The digital certificate 212 is signed by the token service 106 enabling a recipient to verify the authenticity of the token 106.

The transaction instructions 204 includes instructions to the recipient with respect to a requested transaction. The transaction instructions 204 include a transaction type, as well as data for the transaction type's requisite parameters. For example, for a payment transaction, the transaction instructions 204 include a source account, a destination account, a payment date and time, and a payment amount. A currency exchange transaction includes an account number, a currency pair for the exchange, an amount of one of the currencies in the pair, and a date and time to execute the exchange.

The digital signature 206 is generated by a user's application based on the private key of the user. A user can verify the authenticity of the message by using the public key of the user. The translation message 200 can also include a digital certificate issued by a trusted third party such that the recipient can verify the authenticity that the public-private key pair used to authenticate the user actually corresponds to the user.

FIG. 3 is a block diagram of a user device 102 suitable for use in the system 100. Suitable user devices 102, as mentioned above in relation to FIG. 1, include, without limitation, cellular telephones, smart phones, personal digital assistants, lap top computers, palm top computers, and other hand held computing devices, including BLACKBERRY communication devices offered by Research in Motion Limited, headquartered in Waterloo, Ontario, Canada. The user device 102 includes a processor 302, a memory 304, an authentication device 306, a display 308, a user interface 310, and a wireless transceiver 312.

The processor 302 is preferably a general purpose processor capable of executing a transaction application and controlling and/or interfacing with the remaining components of the user device 102. However, in alternative implementations, the processor 302 is a special purpose processor configured for carrying out the functionality described herein. The memory 304 is preferably coupled to the processor via a bus. The memory 304 may include both volatile and non-volatile memory. For example, the memory may include volatile memory for storage of loaded application instructions and application data, as well as a hard drive or integrated circuit storage device, such as a flash memory device. The non-volatile memory stores a transaction application 314 for execution on the processor 304. In some implementations, the memory also stores a high assurance digital certificate 316 issued by a trusted certificate authority. Preferably, the memory 304 stores digital certificate 316 in a secure fashion, such that it cannot be accessed by a user without the user authenticating him or herself via the authentication device 306. Alternatively, a digital certificate is loaded into volatile memory temporarily from a smart card or other separable memory device used to authenticate a user.

The authentication device 306, in one implementation is a smart card reader for accessing data stored on a smart card. The stored data may include a high assurance digital certificated associate with a particular user. Alternatively, the stored data may include a code suitable for accessing such a digital certificate securely stored in the memory 304 of the user device 102. In still another alternative, the smart card includes a secret code shared between the token service 106 and the user device 102.

In an alternative embodiment, the authentication device 306 is a RFID reader for receiving a signal from a RFID transponder corresponding to the user of the user device 102. In one particular implementation, the RFID transponder is a passive RFID chip being powered by signals transmitted by the RFID reader. In another implementation, the RFID transponder is an active RFID chip having its own power source. As with the smart card, the RFID transponder may provide a digital certificate, a code for accessing a digital certificate, or other secret code used to prove that the user device 102 is being used by the user that corresponds to the transponder.

Alternative authentication devices 306 include biometric data inputs, such as retinal scanners, fingerprint scanners, and speaker recognition devices. The authentication device 306 may also be integrated into the transaction application 314. For example, the transaction application, in one implementation prompts a user on the display 308 to enter a user ID and password via the user interface 310.

The display 308 may include any suitable display for presenting sufficient data to a user for the user to make determinations with respect to available transactions and to display a graphical user interface for the user to enter such transactions. The user input 310 may include, without limitation, a keypad, keyboard, touch screen, and/or a speech recognition system.

The wireless transceiver 312 includes one or more transceivers capable of wireless communications. The transceiver may be a BLUETOOTH transceiver, a WIFI transceiver, a WIMAX transceiver, a cellular transceiver, a PCS transceiver, or any other transceiver suitable for secure wireless communications. Alternatively, the wireless transceiver 312 may include separate receivers and transmitters.

Figure 4:
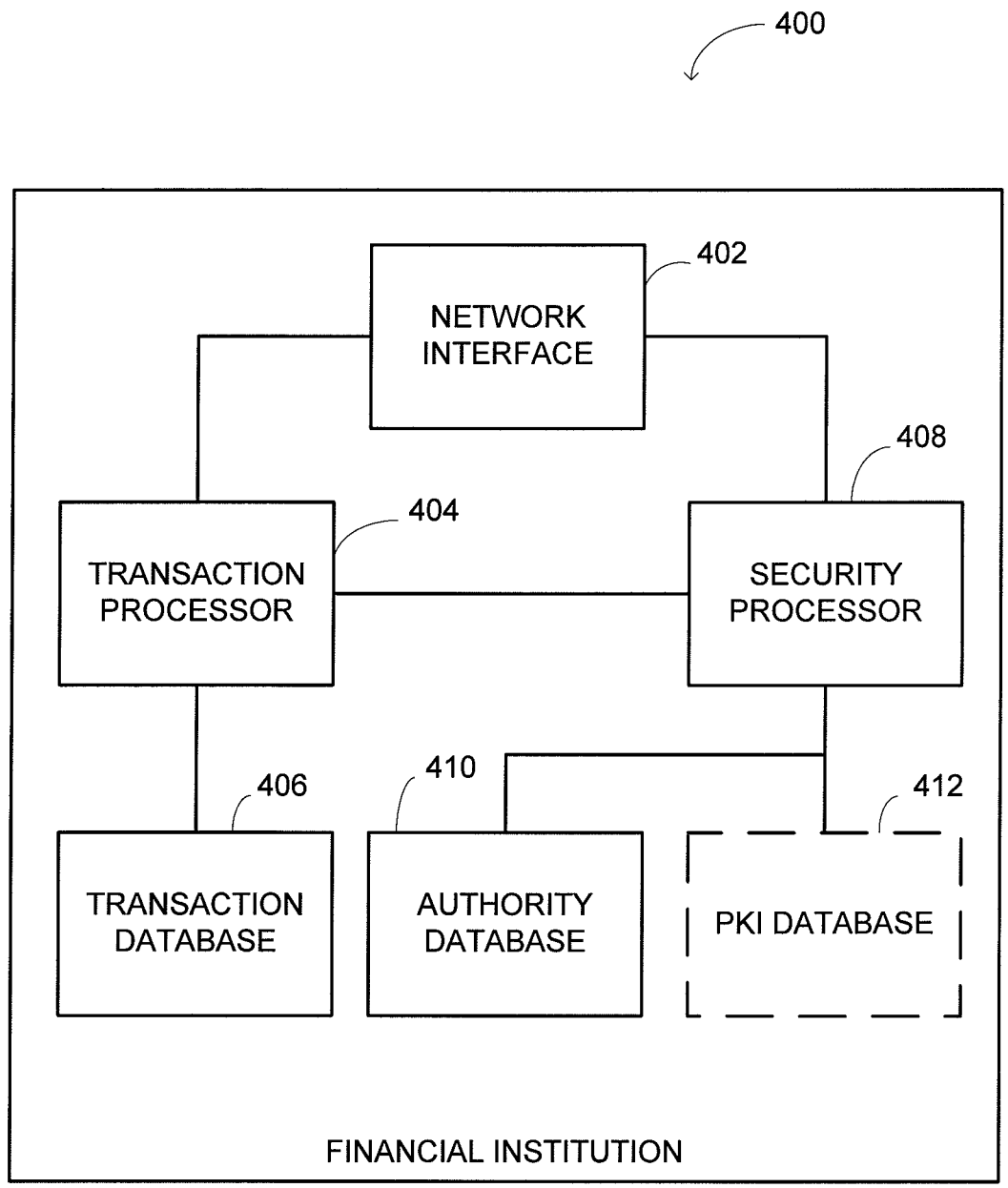
FIG. 4 is a block diagram of a financial institution system suitable for use in the system of FIG. 1, according to an illustrative embodiment of the invention.

FIG. 4 is a block diagram of the relevant computing infrastructure of a financial institution 400, according to an illustrative embodiment of the invention. The infrastructure 400 includes a network interface 402, a transaction server 404, a transaction database 406, a security server 408, an authority database 410, and optionally, a PKI database 412. The various components may be implemented on one or more hardware platforms, networked together by a local area network.

The network interface 402 provides communications links to one or more external data networks. The data networks may be public wide area networks, such as the Internet, or they may be private networks, such as private financial networks.

The transaction server 404 is responsible for managing and executing financial transactions. In one embodiment, the transaction server 404 includes computer executable instructions stored on a computer-readable medium for execution by a general purpose processor. The infrastructure 400 may also include several transaction servers 404, and a load-balancing proxy server to distribute transaction loads among the transaction servers 404. The transaction server 404 is responsible for transmitting data to users of user devices 102 related to potential transactions, receiving transaction instructions from user devices 102, and executing any authorized transactions included in the transaction instructions. Data sent to user devices 102 may be obtained from the transaction database 406, which stores data related to user accounts. The transaction database 406 may also store additional financial information, including, without limitation, current and historical stock and derivative prices, market indicators, bond prices and yields, currency exchange rates, company securities data, trade data, and prices and availability of goods and/or services. In one embodiment, the transaction database 406 includes one or more networked database servers. In another embodiment, the transaction database executes on the same general purpose processor as the transaction server 404.

Before executing a transaction, and in some circumstances, before transmitting certain data to a user device 102, the transaction server 404 first authenticates the user and the user's permissions. To do so, the transaction server 404 utilizes the security server 408. The security server 408 includes computer readable instructions executing on a general purpose processor. The general purpose processor may be the same processor as the processor executing the computer readable instructions of the transaction server 404. Alternatively, the security server 408 may execute on its own processor. In addition, like the transaction server 404, the infrastructure 400 may include additional security servers 408 and a load balancing server to distribute authentication and authorization requests among the security servers 408.

The security server 408 is responsible for authenticating user devices 102 and users, and for verifying user permissions. User devices are authenticated through a combination of verifying the digital signature 206 and/or digital certificate attached to a transaction message 200 by the user device 102 and by verifying the digital certificate 212 incorporated into the token 202 supplied by the token service 106. The digital signature 206 can be verified using the optional local PKI database 412, or by contacting a certificate authority certifying the user's public key. The digital certificate 212 in the token 202 is verified with a certificate authority responsible for certifying the public key of the token service 106.

The security server 408 verifies user permissions based on entitlement data 210 stored in the token 202 of a transaction message 200. In one embodiment, in which the entitlement data 210 identifies a role or position associated with the user, the security server 408 queries the authority database 410 to identify the permissions associated with that role or position. Assigning permissions based on role or position enables relatively easy management of permissions at the expense of providing permission granularity. For example, if an employee receives a promotion, the employee's permissions need not be individually reassigned. Instead, the token service 106 can be informed of their new role or position, and the employee will receive all permissions associated with the new role.

Alternatively, in situations in which more fine control of permissions is desired, the entitlements data can include an explicit list of the user's permissions. In this implementation, the security server merely needs to verify the authenticity of the token 202. No reference to the authority database 410 is needed.

Figure 5:
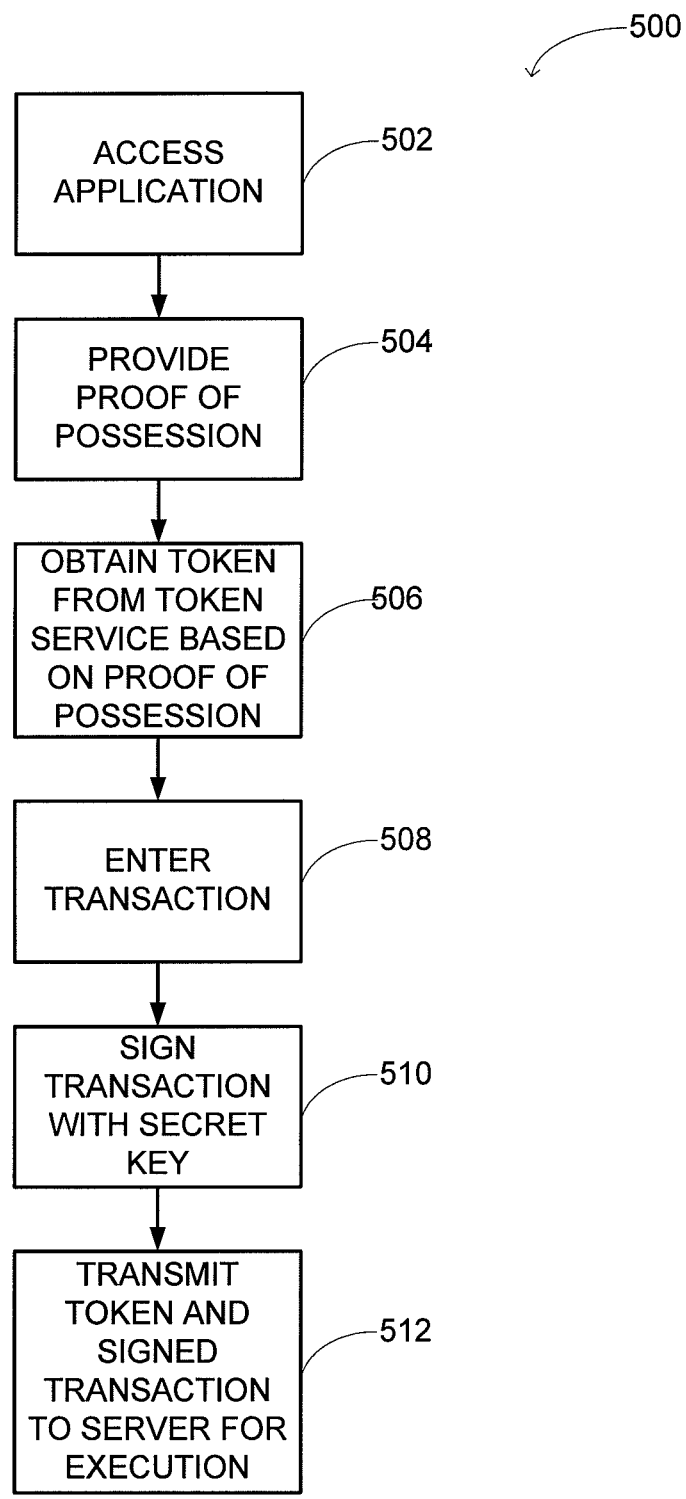
FIG. 5 is a flow chart of a first method of submitting transaction instructions from a mobile device to a financial institution system, according to an illustrative embodiment of the invention.

FIG. 5 is a flow chart of a first method 500 of submitting transaction instructions from a mobile device to a financial institution system, according to an illustrative embodiment of the invention. The method 500 begins with a user accessing a transaction application, such as transaction application 314, on a mobile device, such as user device 102 (step 502). Upon launching the transaction application 314, the user is prompted for and provides a proof of possession (step 504). That is, the user authenticates him or herself to the user device 102 using an authentication device, such as any of the authentication devices described above in relation to authentication device 306. Using the data obtained during the proof of possession test (step 504), for example, a high assurance digital certificate or other credentials, the transaction application 314 obtains a token, such as token 202, from a token service, such as token service 106 (step 506). Upon receipt of a token, the user enters a transaction into the user device 102 (step 508). The transaction application 314 forms a transaction message, including the entered transaction and the token, and signs the transaction message with a secret key (step 510), for example, the user's private key of a private-public key pair. The transaction application 314 transmits the signed transaction message, including the transaction instructions and the token, to a financial institution for execution (step 512).

Figure 6:
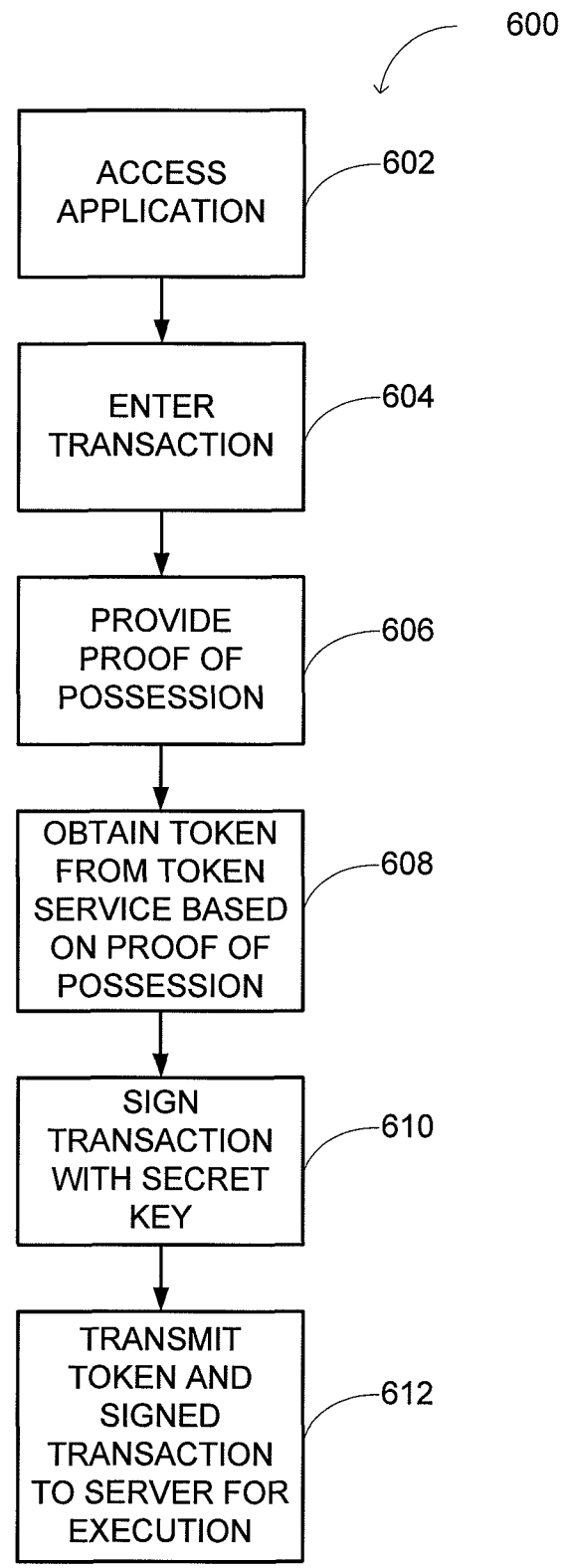
FIG. 6 is a flow chart of a second method of submitting transaction instructions from a mobile device to financial institution system, according to an illustrative embodiment of the invention.

FIG. 6 is a flow chart of a second method 600 of submitting transaction instructions from a mobile device to a financial institution system, according to an illustrative embodiment of the invention. In contrast to the method 500, in which a user provides a proof of possession once upon launching a transaction application, in the method 600, the user proves possession and obtains a new token for each entered transaction. In alternative implementations, a user is required to re-prove possession of the user device 102 after a predetermined amount of time has lapsed since a prior proof. In still another alternative implementation, the transaction application 314 or the transaction server 404 of a financial institution dynamically determines whether a new proof of possession is required based on the type and/or magnitude of the transaction being requested.

The method 600 begins with a user accessing a transaction application, such as transaction application 314, on a mobile device, such as user device 102 (step 602). The user then enters a transaction into the user device 102 (step 604). Upon entry of the transaction (step 604), the user is prompted for and provides a proof of possession (step 606). Using the data obtained during the proof of possession test (step 606), for example, a high assurance digital certificate or other credentials, the transaction application 314 obtains a token, such as token 202, from a token service, such as token service 106 (step 608). Upon receipt of a token, the transaction application 314 forms a transaction message, including the entered transaction and the token, and signs the transaction message with a secret key (step 610), for example, the user's private key of a private-public key pair. The transaction application 314 transmits the signed transaction message to a financial institution for execution (step 612).

Figure 7:
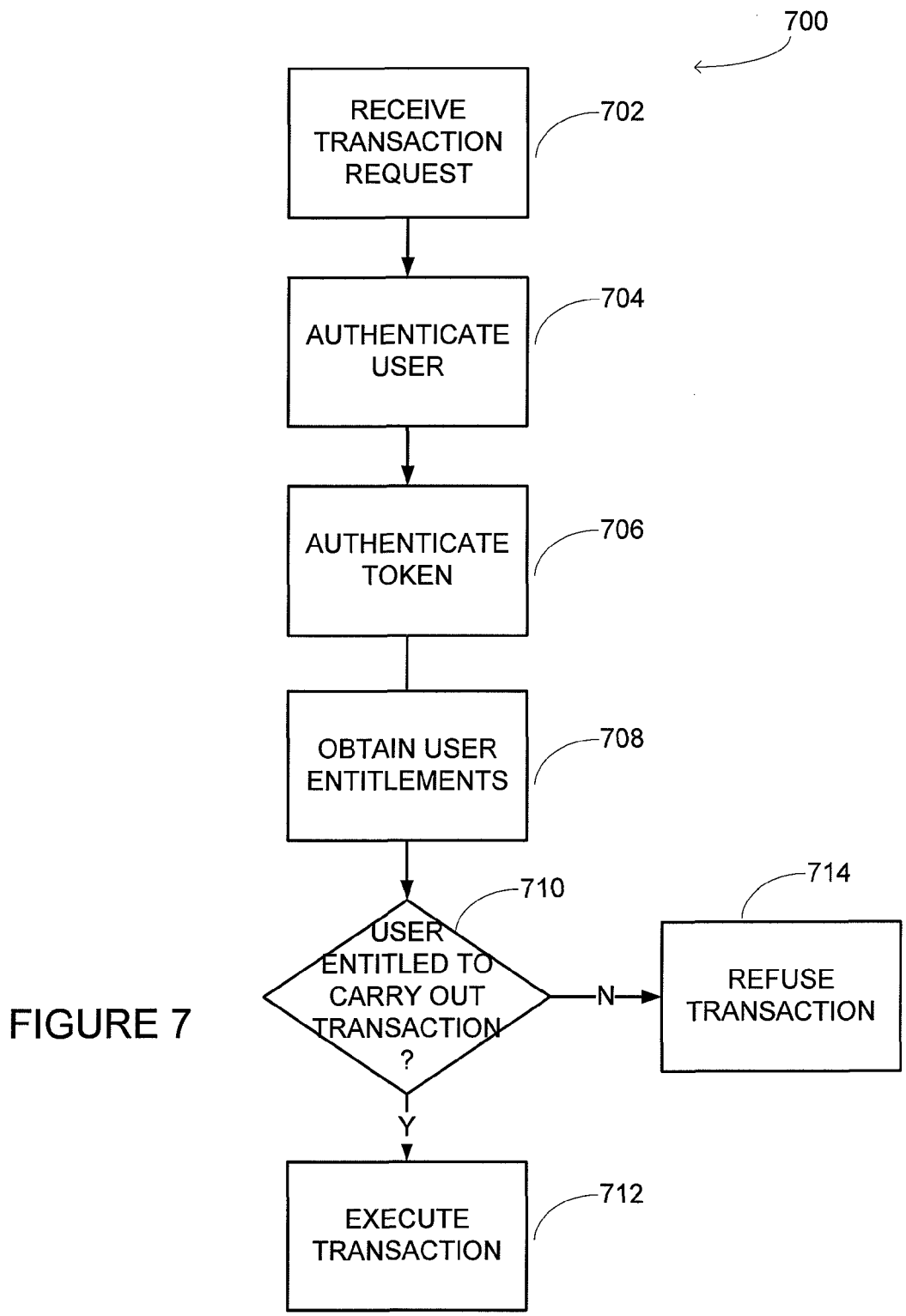
FIG. 7 is a flow chart of a method of processing a received transaction message from a mobile device, according to an illustrative embodiment of the invention.

FIG. 7 is a flow chart of a method 700 of processing a received transaction message from a mobile device, according to an illustrative embodiment of the invention. The method begins with a financial institution receiving a transaction message, such as transaction message 200, from a user device, such as user device 102 (step 702). The financial institution then authenticates the user (step 704) based on the digital signature used to sign the transaction message. The user may be authenticated, for example, by contacting a certificate authority issuing the user his or her public-private key pair, or by looking up the user's public key in a trusted local database of PKI information.

The financial institution then authenticates the token (step 706) included in the transaction message 200. The token is authenticated by contacting the certificate authority issuing the digital certificate included in the token. Based on the entitlement data included in the token, the financial institution obtains the user's entitlements and permissions, as described above in relation to FIG. 4 (step 708).

At decision block 710, based on the obtained entitlements, the financial institution determines whether the user has the authority to carry out the requested transaction. If the user is authorized, the financial institution executes the transaction (step 712). Otherwise, the transaction is refused (714). In response to a transaction being refused (step 714), the financial institution may inform the user of the refusal. The financial institution may also inform the user's supervisor or with designated security personnel affiliated with an account involved in the transaction.

Figure 8:
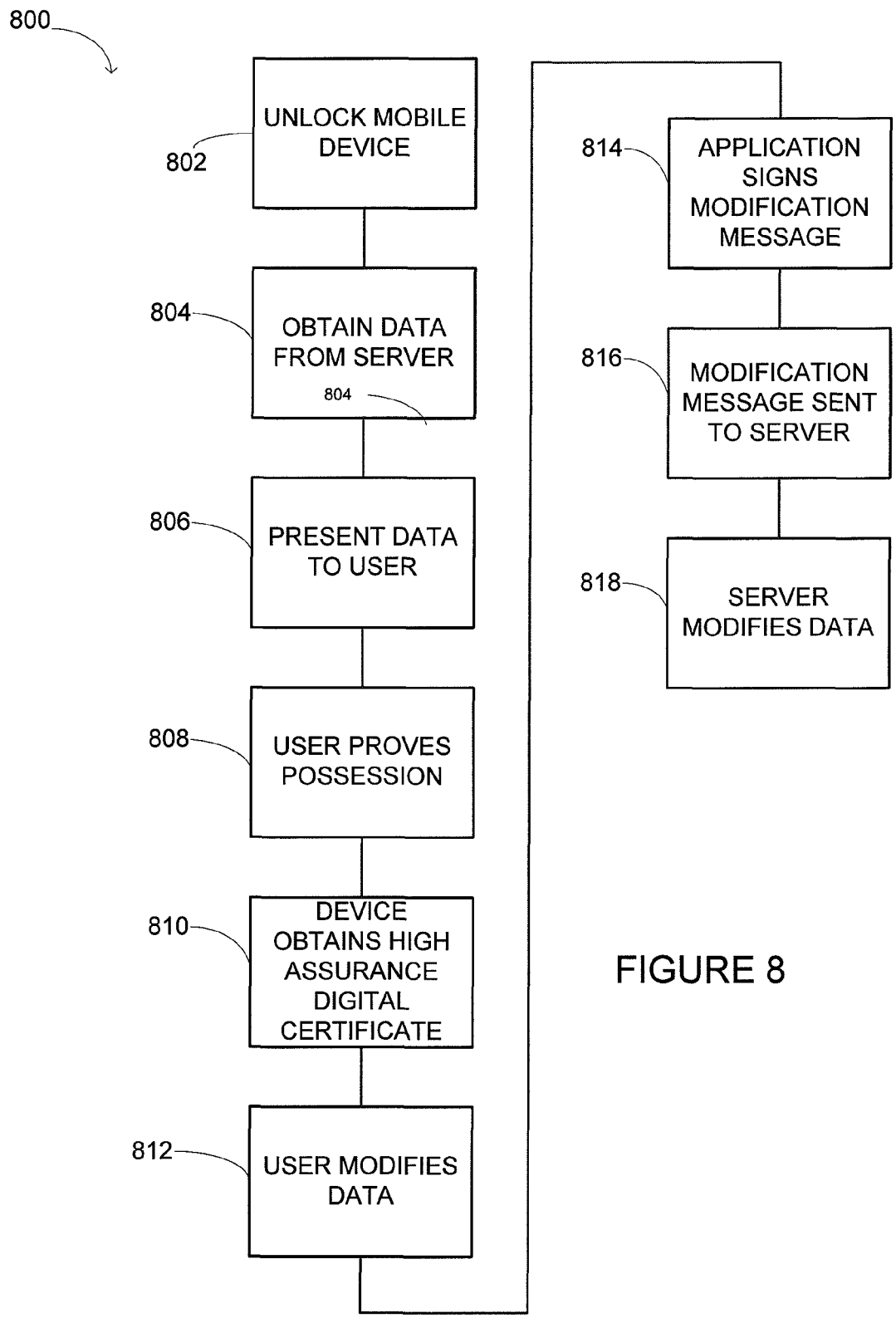
FIG. 8 is a flow chart of a third method of submitting transaction instructions from a mobile device to a financial institution, according to an illustrative embodiment of the invention.

FIG. 8 is a flow chart of a third method 800 of submitting transaction instructions from a mobile device to a financial institution, according to an illustrative embodiment of the invention. The method begins with a user unlocking his or her mobile device (step 802). A device may be unlocked, for example, by entering a password or by deactivating a key lock feature of the device. Upon launching a transaction application, such as transaction application 314, the user device 102 obtains data from a server at the financial institution (step 804). The data includes, for example, proposed transactions requiring the user's sign-off prior to execution. The user device then displays the data to the user (step 806).

The user then provides a proof of possession (step 808) via the authentication device 306 of the user device 102 to obtain access to a high assurance digital certificate (step 810). The user device may obtain access to the digital certificate by downloading it from a device used to prove the user's possession of the device. Alternatively, data obtained from the possession proof is used to decrypt the digital certificate previously stored in a device memory, enabling its usage in authenticating transactions.

The user then modifies the presented data (step 812). For example, the user may modify and/or authorize one or more of the displayed transactions. Upon indication of the user to submit the revised data, the transaction application 314 forms and digitally signs a data modification message including the revised financial data and the high assurance digital certificate to which access was obtained at step 810 (step 814). The transaction application 314 then transmits the signed data modification message to the server at the financial institution (step 816). Upon receipt of the data modification message and authentication of the user, the server modifies the data (step 818), for example by modifying and/or executing transactions included in the data modification message.

The invention may be embodied in other specific forms without departing from the spirit or essential characteristics thereof. The forgoing embodiments are therefore to be considered in all respects illustrative, rather than limiting of the invention.

What is claimed is:

1. A method of managing remote communications on a remote wireless device using a Public Key Infrastructure (PKI) system, comprising the steps of:
   receiving at a centralized system a message containing at least one transaction request transmitted by a user using the remote wireless device which is digitally signed by the user using a private key associated with the user, accompanied by a token from a security token service which contains data or information relating to the user's entitlements and which is digitally signed by the security token service using a second private key associated with the security token service, said centralized system containing information relating to the entitlements required for at least the requested transaction;
   communicating with a first trusted third party to authenticate the transaction request using a public key associated with the user, wherein the first-trusted third party operates independently of the user;
   communicating with a second trusted third party to authenticate the token using a key associated with the security token service, wherein the second trusted third party operates independently of the token service;

verifying at the centralized system, the entitlement information contained in the token to confirm whether the user is authorized to perform the requested transaction; and performing the requested transaction if the user's entitlements satisfy required entitlements associated with the requested transaction.

2. The method of claim 1, wherein the transaction comprises a banking transaction.

3. The method of claim 1, wherein the transaction comprises a payment transaction.

4. The method of claim 1, wherein the transaction comprises a securities transaction.

5. The method of claim 1, wherein the transaction comprises a currency exchange transaction.

6. The method of claim 1, comprising authenticating the token.

7. The method of claim 1, wherein the centralized system contains data related to a first set of users entitled to carry out a first set of transactions and data related to a second set of users entitled to carry out a second, at least partially different set of transactions.

8. The method of claim 1, wherein the centralized system receives the message according to the SOAP protocol.

9. A method for submitting a transaction by a mobile device, comprising:
   receiving, by the mobile device, data from a first trusted third party authenticating the identity of a user of the mobile device using a public key associated with the user;
   communicating with a second trusted third party to obtain a token that indicates entitlement data for the user and which is digitally signed by an independent security token service using a second private key associated with the security token service;
   generating, by the mobile device, a transaction message including the token, wherein the transaction message verifies the authenticated identity of the user and entitlement data associated with the user;
   digitally signing the transaction message and appending a digital certificate thereto; and
   transmitting the signed transaction message to a server for execution.

10. The method of claim 9, wherein the transaction comprises a financial transaction.

11. The method of claim 9, wherein receiving data authenticating the identity of the user comprises receiving data from an RFID device in possession of the user.

12. The method of claim 9, wherein receiving data authenticating the identity of the user comprises reading data from a smart card inserted into one of the mobile device and a smart card reader coupled to the device.

13. The method of claim 12, comprising retrieving the token from the smart card.

14. The method of claim 12, comprising retrieving a digital certificate from the smart card.

15. The method of claim 9, wherein receiving data authenticating the identity of the user comprises receiving user biometric data.

16. The method of claim 15, wherein the token includes a token service digital certificate.

17. The method of claim 9, comprising obtaining the token by transmitting the data authenticating the identity of the user to a token service.

18. The method of claim 17, wherein the token is obtained and the data authenticating the identity of the user is transmitted to the token service according to the SOAP protocol.

19. The method of claim 9, comprising obtaining the token by transmitting a digital certificate to the token service based on the data authenticating the identity of the user.

20. The method of claim 9, wherein the token is securely stored on the mobile device, the method comprising gaining access to the token in response to receiving data authenticating the identity of the user.

21. The method of claim 9, wherein the data or information relating to the user's entitlements includes at least one of an authority level associated with the user, a role identifier that identifies an organizational role of the user in a company, and a set of actions that the user is authorized to make.

22. The method of claim 9, further comprising determining one or more types of transactions that the user is permitted to execute and one or more limits imposed on the permission based on the information relating to the user's entitlements.

23. A method for managing communications between and among financial services systems, users of financial services systems, and trusted third parties in Public Key Infrastructure (PKI) comprising:
   receiving at a centralized system a user remotely-generated message containing at least one financial transaction which is digitally signed by such user using its private key, accompanied by a token from a security token service which contains data or information relating to the user's entitlements, wherein said centralized system contains i) information relating to the entitlements required for at least the requested transaction and ii) applications and databases for recording and updating financial information and transactions;
   communicating with a first trusted third party to authenticate the message using the user's public key, wherein the first trusted third party operates independently of the user;
   communicating with a second trusted third party to authenticate the token using a key associated with the security token service to confirm whether the user is authorized to perform the requested transaction, wherein the second trusted party operates independently of the token service;
   performing the requesting transaction if the user's entitlements satisfy the required entitlement for the requested transaction; and
   updating said applications and databases to reflect the at least one financial transaction contained in the message or electronically transmitting to another system or database instructions to perform said at least one financial transaction.

24. A mobile device for submission of transaction instructions comprising:
   a wireless transceiver;
   an authentication device for accepting data from a first trusted third party indicative of the identity of a user of the mobile device;
   a processor configured to:
      retrieve, based on the data accepted by the authentication device, a secure token including the identity of the user and information or data relating to entitlements associated with the user from a second trusted third party; wherein the secure token is digitally signed by a security token service using a private key associated with the security token service, and the second trusted third party operates independently of the security token service;
      generate a transaction message including the transaction to be submitted and the retrieved token;

sign the transaction message utilizing a digital certificate; and transmit the signed transaction message to a server via the wireless transceiver for execution.

25. The mobile device of claim 24, comprising a memory for storing the token and wherein the processor is configured to retrieve the token from the memory in response to the data accepted by the authentication device.

26. The mobile device of claim 24, wherein the processor retrieves the token in part by transmitting a token request via the wireless transceiver based on the data accepted by the authentication device.

27. The mobile device of claim 26, wherein the token request is transmitted using the SOAP protocol.

28. The mobile device of claim 24, wherein the authentication device comprises an RFID reader.

29. The mobile device of claim 24, wherein the authentication device comprises a biometric data input.

30. The mobile device of claim 24, wherein the authentication device comprises a smart card reader.

31. The mobile device of claim 30, wherein the smart card reader is coupled to the mobile device by a wired or wireless link.

32. The mobile device of claim 30, wherein the processor retrieves the token via the smart card reader.

33. The mobile device of claim 30, wherein the processor is configured to retrieve the digital certificate from the smart card reader.

34. The mobile device of claim 24, wherein the processor is configured to access the digital certificate in response to the data accepted by the authentication device.

35. A transaction system comprising:
a mobile device for submitting a transaction message, digitally signed by a user of the mobile device using a private key associated with the user, to a financial institution, wherein the transaction message includes transaction instructions and a token indicating entitlements of the user of the mobile device wherein the transaction message is authenticated by a first trusted third party that operates independently of the user;
a second trusted third party token service for verifying the identity and entitlements of the user of the mobile device based on authentication data provided by the mobile device and for providing the token to the mobile device in response thereto, the token being digitally signed by a token service using a second private key associated with the token service, wherein the second trusted token service third party operates independently of the user and is distinct from the first trusted third party; and
a certificate authority for verifying a digital signature used to sign the transaction message; and
a financial institution system for receiving the transaction message, obtaining verification of the authenticity of the transaction message by communicating with the certificate authority, determining that the user of the mobile device is entitled to execute the transaction instructions based on the entitlements included in the token.

* * * * *